Patented May 15, 1951

2,552,537

UNITED STATES PATENT OFFICE 2,552,537

O-POLYHALOPHENYL DIAMIDOTHIOPHOSPHATES

Lewis R. Drake, Midland, and Arthur J. Erbel, Bay City, Mich., assignors to The Dow Chemical Company, Midland, Mich., a corporation of Delaware No Drawing. Application October 15, 1948, Serial No. 54,828

6 Claims. (Cl. 260—461)

This invention is concerned with diamidothiophosphates and is particularly directed to compounds of the formula:

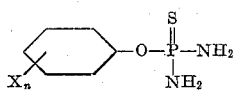

wherein each X is chlorine or bromine, and $n$ is an integer from 2 to 5, inclusive. These O-polyhalophenyl diamidothiophosphates are oils or crystalline solids, substantially insoluble in water, somewhat soluble in many organic solvents, stable to light and air, and of value as toxic constituents in miticidal, insecticidal and fungicidal compositions. They may also be employed as intermediates in the preparation of more complex organic derivatives and as addition agents in extreme pressure lubricants.

The new diamidothiophosphate products may be prepared by successively reacting thiophosphoryl chloride ($PSCl_3$) with a polyhalophenol and ammonia.

The initial phase of the reaction is conveniently accomplished by dissolving one molecular proportion of the phenol in a molecular excess of pyridine and adding this solution portionwise to one molecular proportion of thiophosphoryl chloride. If desired, the pyridine may be partially replaced with an inert solvent such as benzene, provided that at least one molecular proportion of pyridine for each molecular proportion of phenol be present in the reactant solution. The reaction between the phenol and thiophosphoryl chloride is exothermic and the temperature of the reaction mixture may increase somewhat during the addition of the phenol solution. It has been found that the reaction takes place at temperatures of from 30° to 100° C. depending upon the particular phenol concerned. In practice, it is frequently convenient to operate at the boiling temperature of the reaction mixture and under reflux. Following completion of the reaction between the phenol and thiophosphoryl chloride, an optional step comprises filtering the mixture to separate by-product pyridine hydrochloride. Where this step is followed, the filtrate constitutes one of the reactants for the second phase of the process, otherwise, the crude reaction mixture may be reacted directly with ammonia.

In an alternative and preferred procedure, the phenol-pyridine solution may be reacted with a large molecular excess of thiophosphoryl chloride. The reaction mixture is then filtered to separate pyridine hydrochloride, and the excess thiophosphoryl chloride recovered by fractional distillation under reduced pressure. The still residue from the partial fractionation is then reacted with ammonia as subsequently described.

The second phase of the reaction is carried out by cooling the intermediate reaction mixture of the preceding paragraphs to a temperature of between about 25° and 40° C., and contacting the cooled product with ammonia. The ammonia is employed in the amount of at least 4 molecular proportions for each molecular proportion of phenol, and the use of a large excess has been found desirable. The actual reaction may be accomplished either by passing gaseous ammonia into the intermediate product in liquid form, or by adding the intermediate product portionwise to liquid ammonia. In either operation, the temperature does not appear to be critical.

Following the reaction with ammonia, the resulting mixture may be warmed, blown with an inert gas, or otherwise manipulated to evaporate off unreacted ammonia. The residue is extracted with a suitable organic solvent to separate the organic product of reaction from by-product inorganic salts. The extract may be washed if desired, with dilute aqueous acids, alkalies and water. The solvent is then evaporated to recover the desired diamidothiophosphate product as a residue. The latter may be further purified by additional washing, recrystallization, clarification with adsorbent earths or carbons, or other conventional manipulation.

The following examples illustrate the invention but are not to be construed as limiting.

*Example 1*

16.3 grams (0.1 mol) of 2,4-dichlorophenol was dissolved in 50 milliliters of pyridine and added portionwise with stirring to 16.95 grams (0.1 mol) of thiophosphoryl chloride. The mixture became quite warm from heat of reaction and was allowed to stand for 16 hours. At the end of this time the intermediate product was poured into 25 milliliters of liquid ammonia. The excess ammonia was then evaporated out of the mixture at room temperature over a period of 16 hours. The residue was dispersed in acetone, filtered to separate ammonium chloride and pyridine hydrochloride, and the filtrate evaporated to dryness to obtain an O-2,4-dichlorophenyl diamidothiophosphate product as a straw colored low melting solid having a refractive index $n/D$ of 1.5961 at 35° C.

*Example 2*

In a similar fashion 19.7 grams (0.1 mol) of 2,4,5-trichlorophenol, 16.9 grams (0.1 mol) of thiophosphoryl chloride and a large excess of liquid ammonia were reacted together in the presence of 50 milliliters of pyridine to obtain an O - 2,4,5 - trichlorophenyl diamidothiophosphate product as a straw colored oil having a refractive index $n/D$ of 1.5982 at 35° C.

*Example 3*

19.7 grams (0.1 mol) of 2,4,6-trichlorophenol was dissolved in 50 milliliters of pyridine and successively reacted with 16.95 grams (0.1 mol) of thiophosphoryl chloride and a large excess of liquid ammonia substantially as described in Example 1. The ammonia was evaporated off and the residue dispersed in acetone and filtered to remove by-product pyridine hydrochloride and ammonium chloride. The filtrate was evaporated to dryness to recover an O-2,4,6-trichlorophenyl diamidothiophosphate product as a yellow-brown viscous oil having a refractive index $n/D$ of 1.6080 at 35° C.

*Example 4*

0.2 mol quantities each of 2,4,6-tribromophenol and pyridine were reacted with 0.1 mol of thiophosphoryl chloride in the presence of 100 milliliters of benzene, and thereafter with 50 milliliters of liquid ammonia substantially as described in Example 1. The residue from the ammonia evaporation step was filtered to recover a white solid precipitate consisting of a mixture of ammonium chloride and crude diamidothiophosphate product. This solid material was extracted with methylene chloride, and the extract successively washed with dilute aqueous hydrochloric acid, dilute aqueous sodium hydroxide and water, and dried with anhydrous sodium sulphate. The liquid remnant was evaporated to dryness to obtain an O-2,4,6-tribromophenyl diamidothiophosphate product as a light tan solid melting at 145°–160° C. This product was found to contain 56.29 per cent by weight of bromine as compared to 56.5 per cent theoretical. 2,4,5-tribromophenol may be reacted with thiophosphoryl chloride in the presence of pyridine as described in Example 1, and thereafter with ammonia to obtain O-2,4,5-tribromophenyl diamidothiophosphate.

*Example 5*

305 grams (1.3 mols) of 2,3,4,6-tetrachlorophenol was dissolved in 104 grams (1.3 mols) of pyridine, and this solution added portionwise and with stirring to 846 grams (5 mols) of thiophosphoryl chloride over a period of 35 minutes and at a temperature of 10°–25° C. The mixture was allowed to stand for 16 hours and thereafter filtered to separate by-product pyridine hydrochloride. The filtrate was fractionally distilled under reduced pressure to recover 387 grams of excess thiophosphoryl chloride boiling at up to 46° C. at 50 millimeters pressure. The residue from the distillation was mixed with a large molecular excess of liquid ammonia and allowed to stand for 16 hours. The resulting semi-solid mixture was dispersed in about 200 millimeters of acetone, and filtered to separate by-product ammonium chloride. The acetone was then evaporated out of the filtrate to obtain the desired O-2,3,4,6-tetrachlorophenyl diamidothiophosphate product as a rust colored crystalline solid melting at 153°–163° C.

*Example 6*

266.5 grams (1 mol) of pentachlorophenol, 79 grams (1 mol) of pyridine and 300 millimeters of benzene were mixed together and reacted portionwise with 847 grams (5 mols) of thiophosphoryl chloride as described in Example 5. The crude reaction mixture was filtered, fractionally distilled to recover excess thiophosphoryl chloride, and the still residue reacted with a large molecular excess of liquid ammonia. The crude reaction product was dispersed in acetone, filtered to separate ammonium chloride, and the acetone evaporated off to obtain an O-pentachlorophenyl diamidothiophosphate product as an off-white crystalline solid melting at 172°–174° C.

We claim:

1. An O-polyhalophenyl diamidothiophosphate having the formula:

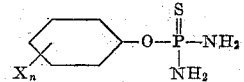

wherein each X represents a halogen of the group consisting of bromine and chlorine, and $n$ is an integer from 2 to 5, inclusive.

2. O-2,4-dichlorophenyl diamidothiophosphate.
3. O-2,3,4,6-tetrachloro diamidothiophosphate.
4. O-pentachlorophenyl diamidothiophosphate.
5. O - 2,4,5 - trichlorophenyl diamidothiophosphate.
6. O - 2,4,6 - trichlorophenyl diamidothiophosphate.

LEWIS R. DRAKE.
ARTHUR J. ERBEL.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,172,241 | Dickey et al. | Sept. 5, 1939 |

FOREIGN PATENTS

| Number | Country | Date |
|---|---|---|
| 500,386 | Great Britain | Feb. 8, 1939 |

OTHER REFERENCES

Autenrieth et al.: "Ber. deutsch. Chem. Ges.," vol. 31 (1898), pp. 1094 to 1099.

Ephraim: "Ber. deutsch. Chem. Ges.," vol. 44 (1911), pp. 3414–3415.